US009163621B2

(12) United States Patent
Yoo et al.

(10) Patent No.: US 9,163,621 B2
(45) Date of Patent: Oct. 20, 2015

(54) APPARATUS FOR CONTROLLING COMPRESSOR AND REFRIGERATOR HAVING THE SAME

(71) Applicants: Jaeyoo Yoo, Seoul (KR); Taewoong Nah, Seoul (KR); Sungho Park, Seoul (KR)

(72) Inventors: Jaeyoo Yoo, Seoul (KR); Taewoong Nah, Seoul (KR); Sungho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 13/752,578

(22) Filed: Jan. 29, 2013

(65) Prior Publication Data
US 2013/0195677 A1 Aug. 1, 2013

(30) Foreign Application Priority Data
Jan. 30, 2012 (KR) .................. 10-2012-0009087

(51) Int. Cl.
F04B 35/04 (2006.01)
F25B 1/02 (2006.01)
(Continued)

(52) U.S. Cl.
CPC ................. *F04B 35/04* (2013.01); *F04B 49/06* (2013.01); *F25B 1/02* (2013.01); *F25B 5/02* (2013.01);
(Continued)

(58) Field of Classification Search
CPC .......... F04B 17/03; F04B 17/04; F04B 23/04; F04B 23/06; F04B 35/045; F04B 49/965; F04B 49/02; F04B 49/12; F04B 49/20; F04B 49/007; F04B 2203/0408; F04B 2207/01; F04B 2207/03; F04B 41/06; F04B 35/04; F04B 49/06; F04B 2207/045; F04B 2203/0404; F04B 2203/0204; F04B 2203/0402; F04B 2203/0401; F04B 2201/0206; F04D 15/02; F04D 15/0245; F04D 15/029; F04D 27/004; F04D 27/005; F04C 23/008; F04C 14/02; F04C 28/02; F04C 14/06; F04C 14/065; F04C 28/06; F04C 28/065; F04C 2270/01; F04C 2270/015; F04C 2270/07; F04C 2270/075; F04C 2270/09; F04C 2270/095; F04C 2270/10; F04C 2270/105; F04C 2240/401; F04C 2240/403; F04C 2240/808; F25B 7/00; F25B 1/00; F25B 1/10; F25B 49/00; F25B 49/022; F25B 5/02; F25B 1/02; F25B 2600/02; F25B 2600/23; F25B 2600/021; F25B 2700/151; F25B 2500/26; F25B 2400/07; F25B 2400/073; F25B 2341/0661; H02P 1/00; H02P 6/08; H02P 5/74
USPC ......................... 417/3–8, 416, 418, 902, 426
See application file for complete search history.

(56) References Cited

U.S. PATENT DOCUMENTS
4,482,008 A * 11/1984 Nomaguchi et al. .......... 165/240
5,857,349 A * 1/1999 Hamaoka et al. ............ 62/228.4
(Continued)

FOREIGN PATENT DOCUMENTS
CN 100588840 C 2/2010
CN 101997479 A 3/2011
(Continued)

OTHER PUBLICATIONS
Proquest Translation of KR 1020050111283 A, published Nov. 24, 2005, translated Mar. 26, 2015.*
(Continued)

Primary Examiner — Devon Kramer
Assistant Examiner — Jon Hoffmann
(74) Attorney, Agent, or Firm — Ked & Associates, LLP

(57) ABSTRACT

A compressor control apparatus, and a refrigerator including the same are provided. Operation of two compressors may be controlled using one inverter, thereby reducing a number of components, increasing compressor capacity, and enhancing operation efficiency of the system. Commonly used switching elements may be switched at an operating frequency, allowing the simultaneous operation of two compressors, reducing switching losses, and improving the efficiency and stability of the system.

15 Claims, 13 Drawing Sheets

(51) Int. Cl.
*F25B 5/02* (2006.01)
*F25B 49/02* (2006.01)
*F04B 49/06* (2006.01)
*F25B 1/10* (2006.01)

(52) U.S. Cl.
CPC ............... *F25B 49/022* (2013.01); *F25B 1/10* (2013.01); *F25B 2341/0661* (2013.01); *F25B 2400/073* (2013.01); *F25B 2500/26* (2013.01); *F25B 2600/021* (2013.01); *F25B 2600/024* (2013.01); *F25B 2600/23* (2013.01); *F25B 2700/151* (2013.01); *Y02B 30/741* (2013.01)

(56) References Cited

U.S. PATENT DOCUMENTS

| | | | | |
|---|---|---|---|---|
| 7,453,229 | B2* | 11/2008 | Lee et al. | 318/632 |
| 2003/0182956 | A1* | 10/2003 | Kurita et al. | 62/228.1 |
| 2004/0124807 | A1* | 7/2004 | Nakata et al. | 318/801 |
| 2005/0141998 | A1* | 6/2005 | Yoo et al. | 417/44.1 |
| 2007/0056300 | A1 | 3/2007 | Crane | |
| 2008/0089792 | A1* | 4/2008 | Bae et al. | 417/44.1 |
| 2009/0093911 | A1* | 4/2009 | Caillat | 700/280 |
| 2009/0140680 | A1* | 6/2009 | Park | 318/438 |

FOREIGN PATENT DOCUMENTS

| | | | | |
|---|---|---|---|---|
| EP | 2 058 937 A1 | 5/2009 | | |
| JP | 2001-16898 A | 1/2001 | | |
| JP | 2001026898 A | * 1/2001 | | H02P 7/74 |
| KR | 10-2005-0111283 A | 11/2005 | | |
| KR | 20050111283 A | * 11/2005 | | F24F 11/00 |

OTHER PUBLICATIONS

Purdue University, Purdue e-Pubs, International Compressor Engineering Conference, 2004, Capacity Modulation of Linear Compressor for Household Refrigerators, Heo, Lee, Song and Jung.*
Proquest Translation of JP2001026898A.*
Chinese Office Action dated Nov. 24, 2014 issued in Application No. 201310036307.2 (Original Office Action and English Translation).
European Search Report dated Dec. 6, 2014 for corresponding Application No. 13153059.4.
Chinese Office Action issued in Application No. 201310036307.2 dated Jun. 9, 2015.

* cited by examiner

APPARATUS FOR CONTROLLING COMPRESSOR AND REFRIGERATOR HAVING THE SAME

CROSS-REFERENCE TO RELATED APPLICATION(S)

This application claims priority under 35 U.S.C. §119 to Korean Application No. 10-2012-0009087, filed on Jan. 30, 2012, whose entire disclosure is hereby incorporated by reference.

BACKGROUND

1. Field

This relates to a compressor control apparatus and a refrigerator comprising the same.

2. Background

In general, compressors convert mechanical energy into compression energy of a fluid and may form part of a refrigerating cycle used in an appliance, such as, for example, a refrigerator, an air conditioner or the like. Compressors may be classified into reciprocating compressors, rotary compressors, and scroll compressors. Reciprocating compressors form a compression space between a piston and a cylinder to suction or discharge a working gas, thereby compressing refrigerant while moving in a linear reciprocating manner. Rotary compressors form a compression space between an eccentrically rotated roller and a cylinder to suction or discharge a working gas, thereby compressing refrigerant while the roller is eccentrically rotated along an inner wall of the cylinder. Scroll compressors form a compression space between an orbiting scroll and a fixed scroll to suction or discharge a working gas, thereby compressing refrigerant while the orbiting scroll is rotated along the fixed scroll.

BRIEF DESCRIPTION OF THE DRAWINGS

Embodiments will be described in detail with reference to the following drawings in which like reference numerals refer to like elements, wherein.

DETAILED DESCRIPTION

In reciprocating compressors, an inner piston may move in a linear reciprocating manner within the cylinder, thereby suctioning, compressing and discharging a refrigerant gas. In a recipro-type reciprocating compressor, a crank shaft may be coupled to a rotating motor and a piston may be coupled to the crank shaft, thereby converting a rotational movement into a linear reciprocating movement. In a linear-type reciprocating compressor, a piston may be connected to a linearly moving mover of the motor, thereby converting a linear movement of the motor into a reciprocating movement of the piston.

Reciprocating compressors may include a power unit for generating a driving force, and a compression unit for receiving the driving force from the power unit to compress a fluid. For example, an electric motor may be used for the electric power unit, and a linear motor may be used in a linear type reciprocating compressor. In a linear motor, the motor may directly generate a linear driving force, without the use of an additional mechanical conversion device, resulting in a less complicated structure. A linear motor may also reduce losses due to energy conversion, and, without a connecting portion causing friction and abrasion, may reduce noise. Furthermore, when a linear type reciprocating compressor (hereinafter, referred to as a "linear compressor") is used in, for example, a refrigerator or air conditioner, a stroke voltage applied to the linear compressor may be changed to change the compression ratio, thereby allowing the linear compressor to provide for variable freezing capacity control.

However, since a linear compressor may perform a reciprocating movement while the piston is not mechanically restricted in the cylinder, the piston may collide with the cylinder wall, or forward movement of the piston may be restricted due to a large load when voltage is suddenly and excessively applied, thereby causing difficulty in performing proper compression. Accordingly, a control apparatus for controlling movement of the piston corresponding to variation of a load or voltage may be considered.

A compressor control apparatus may detect voltage and current applied to the compressor motor and estimate a stroke using, for example, a sensorless method, to perform feedback control, and, may include, for example, a triac or inverter for controlling the compressor. When using an inverter, a compressor control apparatus may use that inverter to control one corresponding compressor. For example, in a refrigerator having a freezing chamber and a refrigerating chamber, two inverters may perform independent control, thereby implementing a refrigerant cycle for each chamber.

Figure 1:
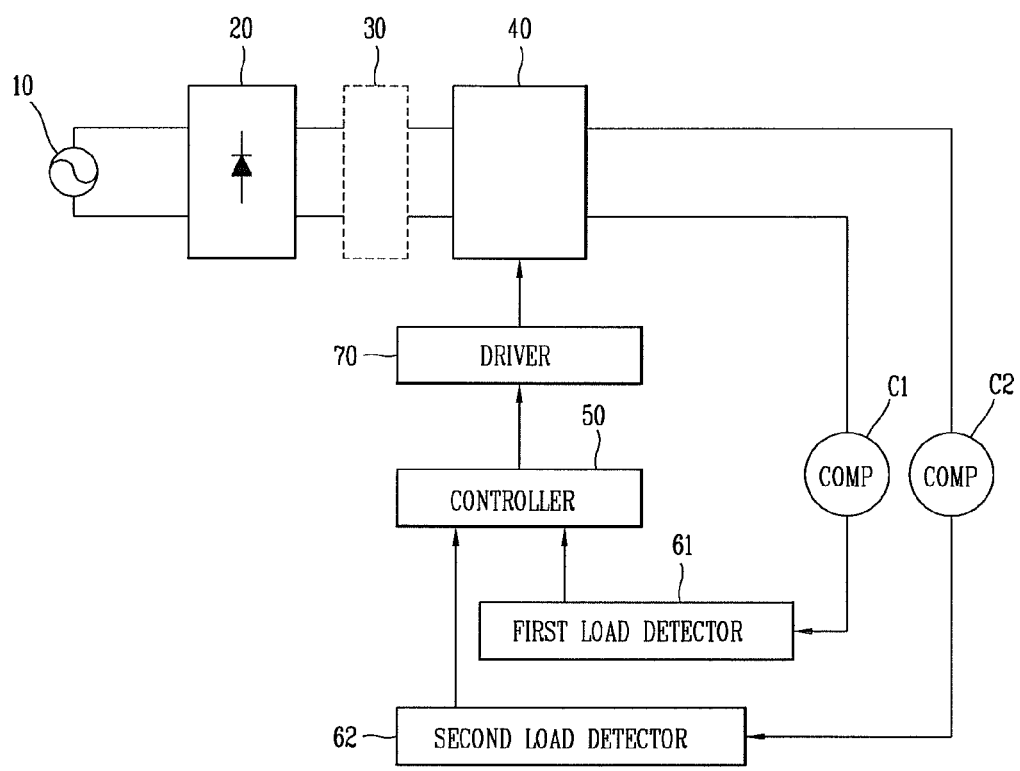
FIGS. 1 and 2 are schematic diagrams of a compressor control apparatus according to embodiments as broadly described herein.
Figure 2:
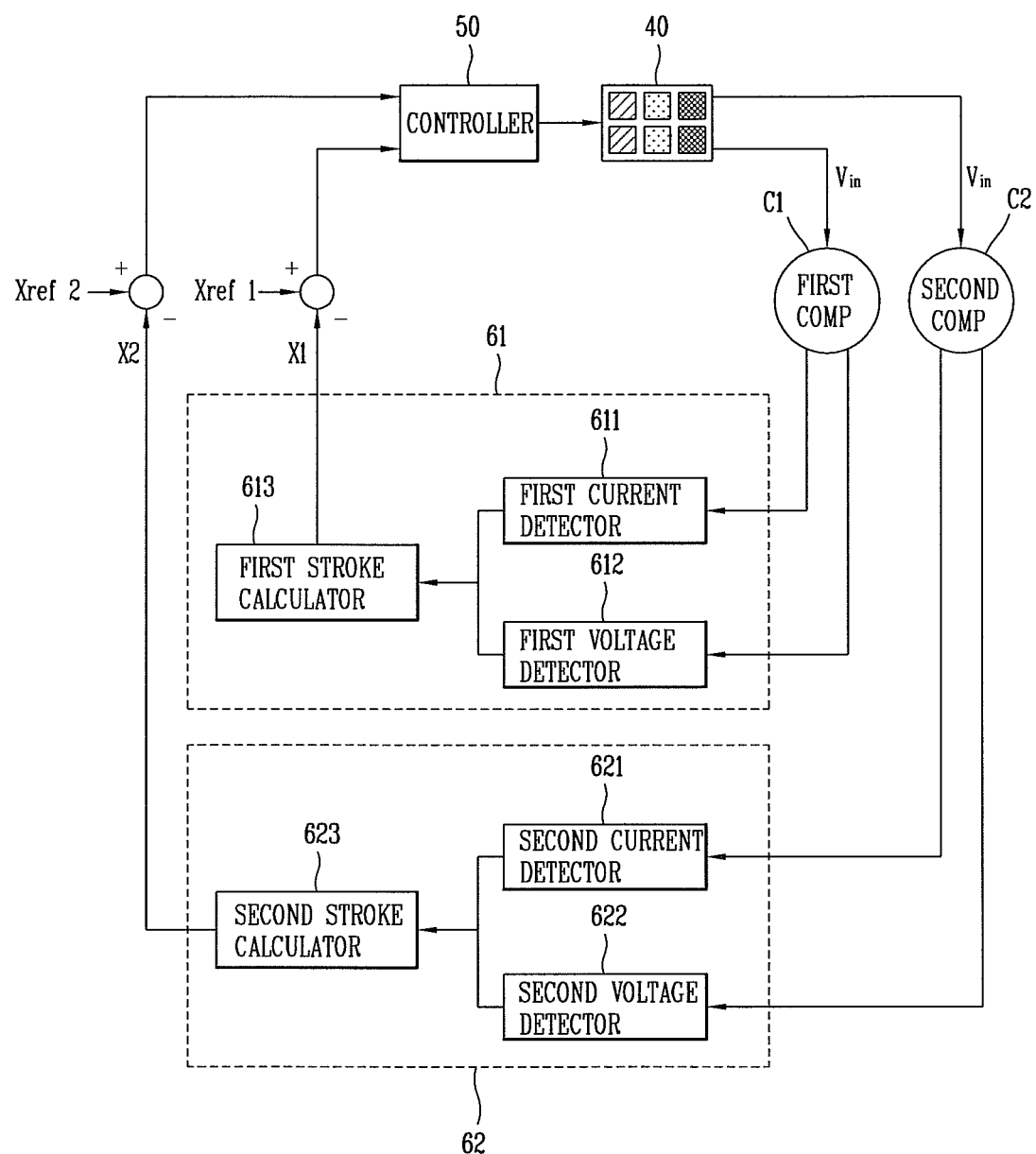
Figure 3:
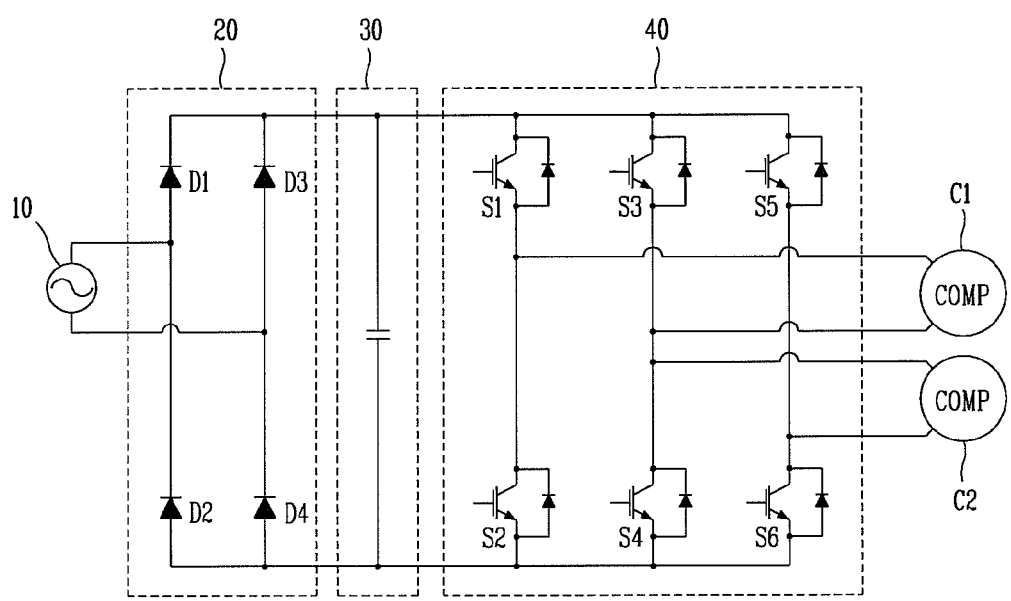
FIG. 3 is a circuit diagram of the compressor control apparatus shown in FIG. 1 or FIG. 2.

Referring to FIGS. 1 through 3, a compressor control apparatus according to an embodiment as broadly described herein may include one inverter 40 provided with three pairs of switching elements S1 through S6. One pair of the three pairs of switching elements S1-S6 may be commonly connected to first and second compressors C1 and C2, and switched based on drive signals for each pair of switching elements. A controller 50 may generate an inverter control signal configured with the drive signals based on a load state of the first and second compressors C1, C2 and output it to the one inverter 40. The inverter 40 may further include freewheeling diodes D1 through D4 connected in parallel to three pairs of switching elements S1-S6.

Referring to FIG. 3, a drive signal for the pair of commonly connected switching elements S3-S4 may have a lower a frequency than those of drive signals for the other pairs of switching elements S1-S2 and S5-S6. In particular, the controller 50 may be configured such that the drive signal for the commonly connected pair of switching elements S3-S4 has an operating frequency. For each drive signal, space vector pulse width modulation (SVPWM) or the like may be used as a PWM signal. In other words, one pair of switching elements S3-S4 commonly connected thereto may be switched at an operating frequency, and a drive signal for the other pairs of switching elements S1-S2 and S5-S6 may have a PWM carrier frequency for operating each compressor C1 and C2.

At least one of the first compressor C1 or the second compressor C2 may be a reciprocating compressor, particularly, a linear compressor. Furthermore, the two compressors C1, C2 may have different capacities. The first and second compressors C1, C2 may be operated simultaneously, or may be operated separately, by a compressor control apparatus using one inverter 40 in a compressor operation mode. The compressor operation mode may be determined by a load or required freezing capacity of the first and second compressor. The compressor operation mode may control the stroke, frequency or the like of each compressor by dividing it into a predetermined value. In certain embodiments, the compressor operation mode may be divided into a separate operation mode of the first compressor, a separate operation mode of the second compressor, and a simultaneous operation mode of the first and second compressor.

Figure 12:
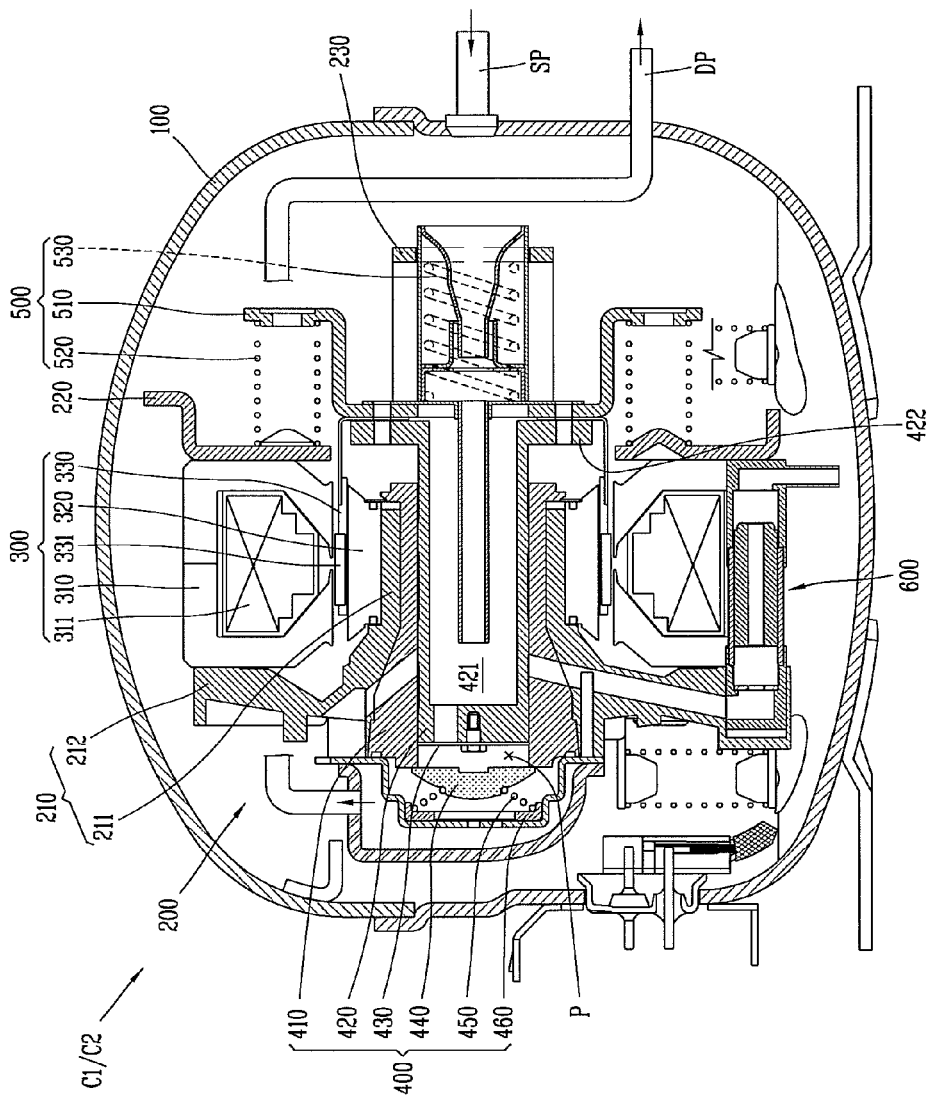
FIG. 12 is a cross-sectional view of an exemplary linear compressor including a compressor control apparatus as embodied and broadly described herein.

Referring to FIG. 12, each of the first compressor and the second compressor may include a casing 100 in communication with a gas suction pipe (SP) and a gas discharge pipe (DP), a frame 200 elastically supported by an inner portion of the casing 100, a motor 300 supported by the frame 200 to allow a mover 330 to perform a linear reciprocating movement, a compression unit 400 in which a piston 420 is coupled to the mover 330 of the motor 300 and supported by the frame 200, and a plurality of resonant units 500 for elastically supporting the mover 330 of the motor 300 and the piston 420 of the compression unit 400 in the movement direction to induce a resonant movement.

The frame 200 may include a first frame 211/212 supporting the compression unit 400 and a front side of the motor 300, a second frame 220 coupled to the first frame 210 to support a rear side of the motor 300, and a third frame 230 coupled to the second frame 220 to support a plurality of second resonant springs 530. The first frame 122/212, second frame 220, and third frame 230 may be all formed of a non-magnetic material, such as aluminum, to reduce core losses.

The first frame may include a frame portion 211 having an annular plate shape, and a cylinder portion 212 having a cylindrical shape into which a cylinder 410 is inserted. The cylinder portion 212 may be formed on a rear surface, namely, lengthwise as an integral body in the motor direction, at the center of the frame portion 211. The frame portion 211 may be formed such that the outer diameter of the frame portion 211 is greater than or equal to the inner diameter of an outer stator 310 of the motor 300 to support both an outer stator 310 and an inner stator 320 of the motor 300.

The first frame 211/212 may be fixed such that the inner stator 320 is inserted into an outer circumferential surface of the cylinder portion 212. In this case, the first frame 211/212 may be formed of a non-magnetic material, such as aluminum, to reduce magnetic losses. Furthermore, the cylinder portion 212 may be formed on the cylinder 410 as an integral body using an insert die casting method. In certain embodiments, the cylinder portion 212 may be screw-assembled such that the cylinder 410 is pressurized or a screw thread is formed at an inner circumferential surface thereof. Furthermore, to improve stability of the cylinder 410, a step surface or inclined surface may be formed between a front side inner circumferential surface and a rear side inner circumferential surface of the cylinder portion 212, thereby allowing the cylinder 410 coupled to an inner circumferential surface of the cylinder portion 212 to be supported in the piston direction.

The motor 300 may include the outer stator 310 supported between the first frame and second frame 220, a coil 311, the inner stator 320 coupled to an inner side of the outer stator 310 at a predetermined interval and inserted into the cylinder portion 212, and the mover 330 in which a magnet 331 is provided to correspond to the coil 311 of the outer stator 310 to perform a linear reciprocating movement along the magnetic flux direction between the outer stator 310 and inner stator 320. The outer stator 310 and inner stator 320 may be formed by laminating a plurality of thin stator core sheets in a cylindrical shape for each sheet or laminating a plurality of thin stator core sheets in a block shape and laminating the stator block in a radial shape.

The compression unit 400 may include the cylinder 410 formed on the first frame 211/212 as an integral body, the piston 420 coupled to the mover 330 of the motor 300 to perform a reciprocating movement in the compression space P of the cylinder 410, a suction valve 430 mounted at a front end of the piston 420 to control the suction of refrigerant gas while opening or closing a suction passage 421 of the piston 420, a discharge valve 440 mounted at a discharge side of the cylinder 410 to control the suction of the compression gas while opening or closing the compression space P of the cylinder 410, a valve spring 450 elastically supporting the discharge valve 440, and a discharge cover 460 fixed to the first frame 210 at a discharge side of the cylinder 410 to accommodate the discharge valve 440 and valve spring 450.

The cylinder 410 may be formed in a cylindrical shape and may be inserted into and coupled to the cylinder portion 212 of the first frame.

The cylinder 410 may be formed of a material having a hardness greater than that of, for example, cast iron, or at least that of the first frame, in particular, that of the cylinder portion 212 taking into consideration abrasion due to forming a bearing surface with the piston 420 an inner circumferential surface which may be made of cast iron.

The piston 420 may be formed of the same material as the cylinder 410, or may be formed of a material having a hardness similar to that of the cylinder 410 to reduce abrasion due to contact with the cylinder 410. Furthermore, the suction passage 421 may penetrate into the piston 420 such that refrigerant is drawn into the compression chamber P of the cylinder 410.

The resonant unit 500 may include a spring supporter 510 coupled to a connecting portion between the mover 330 and the piston 420, first resonant springs 520 supported at a front side of the spring supporter 510, and second resonant springs 530 supported at a rear side of the spring supporter 510.

The compressor may also include a piston connecting portion 422 and an oil feeder 600.

When power is applied to the motor 300 and a magnetic flux is formed between the outer stator 310 and inner stator 320, the mover 330 positioned at a gap between the outer stator 310 and inner stator 320 continuously performs a reciprocating movement due to the resonant unit 500 while moving along the direction of the magnetic flux. When the piston 420 performs a backward movement within the cylinder 410, refrigerant filled in an inner space of the casing 100 passes through the suction passage 421 of the piston 420 and the suction valve 430 and is drawn into the compression space P of the cylinder 410. When the piston 420 performs a forward movement within the cylinder 410, refrigerant gas drawn into the compression space P is compressed to repeat a series of discharge processes while opening the discharge valve 440.

A linear compressor as embodied and broadly described herein may include a compressor control apparatus as described below. Such a linear compressor may have various different installation applications such as a refrigerator or an air conditioner. When the first and second compressors C1, C2 described above are applied to a refrigerator as illustrated in FIG. 13, each compressor may independently control the refrigerating chamber or freezing chamber as appropriate.

Figure 13:
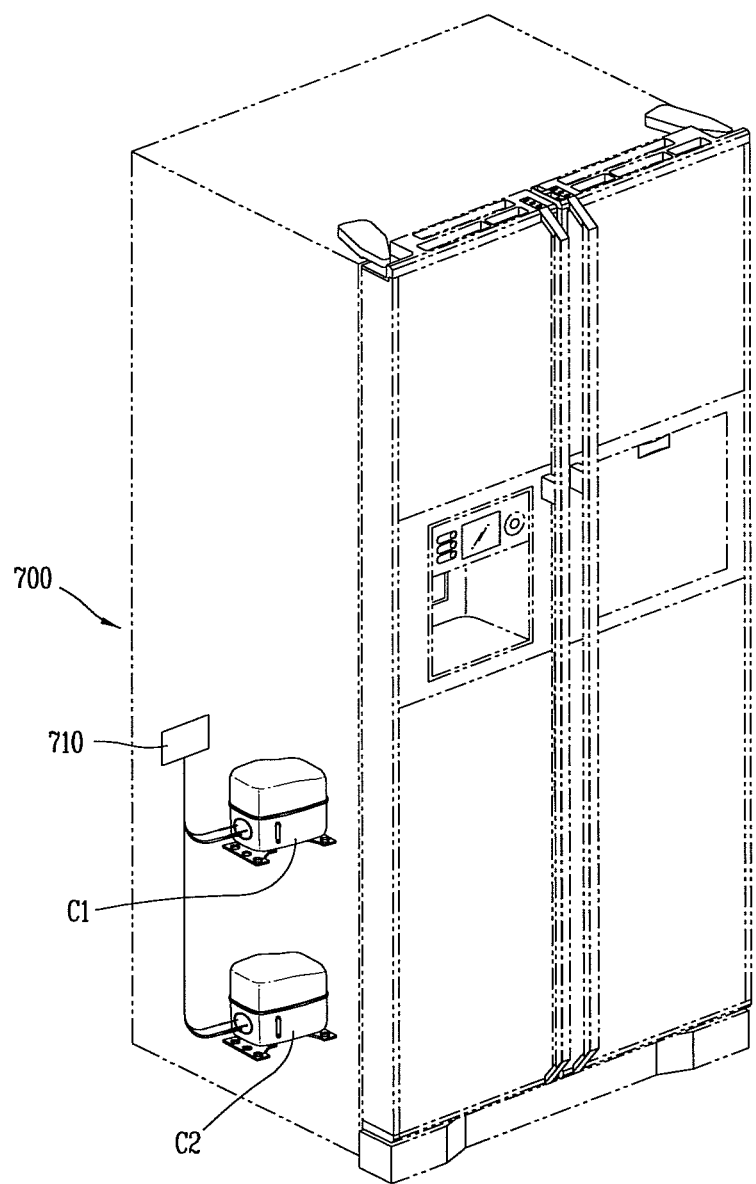
FIG. 13 is a perspective view of an exemplary refrigerator including the linear compressor shown in FIG. 12.

Referring to FIG. 13 together with FIGS. 1 through 3, a refrigerator 700 as embodied and broadly described herein may include a refrigerator body, a first compressor C1 and a second compressor C2 provided in the refrigerator body to compress refrigerant, one inverter 40 provided with three pairs of switching elements S1-S6 switched based on drive signals for each pair of switching elements, a first load detector 61 and a second load detector 62 configured to respectively detect a load of the first and second compressors C1, C2, and a controller configured to generate an inverter control signal configured with the drive signals based on a load state of the first and second compressors C1, C2 and output it to the inverter 40. In certain embodiments, one of the three pairs of switching elements provided in the inverter may be commonly connected to the first and second compressors, and switched at an operating frequency.

Referring to FIG. 13, the refrigerator 700 may include a main board 710 therein for controlling the entire operation of the refrigerator, and connected to the first and second compressors C1 and C2. The compressor control apparatus may be provided in the main board 710. Cool air supplied to an inner portion of the refrigerator may be generated by heat exchange with refrigerant, and continuously supplied to the inner portion of the refrigerator while repeatedly performing compression-condensation-expansion-evaporation cycles. The supplied refrigerant may be uniformly transferred to an inner portion of the refrigerator by, for example, convection, thereby allowing items within the refrigerator to be stored at a desired temperature.

A compressor control apparatus according to an embodiment as broadly described herein may further include a converter 20 configured to rectify commercial alternating current power 10 to direct current power, a smoothing unit 30 configured to smoothen and store the rectified direct current power, and a driver 70 configured to receive the inverter control signal and output the drive signals to the single inverter 40. For example, the driver 70 may output an input voltage, namely, gate voltage, to switching elements, when the switching elements of the inverter are IGBTs or the like, based on the inverter control signal. Referring to FIG. 3, the converter 20 may be a full bridge converter including two pairs of diodes D1-D2 and D3-D4.

Referring to FIG. 1, the compressor control apparatus may further include first and second load detectors 61 and 62 configured to detect a load of the first and the second compressors C1 and C2. In certain embodiments, the controller 50 may generate a control signal controlling the inverter 40 based on the load. In other words, the controller 50 generates the inverter control signal based on the load of the first and second compressors C1, C2 to operate the first and second compressors C1, C2 in a separate or simultaneous manner. The controller 50 generates the inverter control signal using first and second strokes of the first and second compressors C1 and C2, and stroke instruction values for the first and second compressors C1 and C2. In certain embodiments, the load of the compressor may include a motor current, a motor voltage, a stroke, their phase difference, a frequency, and the like. For example, when a compressor is provided in a refrigerator, the load of the compressor may be detected using a load of the refrigerator.

Referring to FIG. 2, the compressor control apparatus may further include a first current detector 611 configured to detect a first motor drive current applied to a first motor provided in the first compressor C1 and a first voltage detector 612 configured to detect a first motor drive voltage applied to the first motor. The compressor control apparatus may further include a second current detector 621 configured to detect a second motor drive current applied to a second motor provided in the second compressor C2 and a second voltage detector 622 configured to detect a second motor drive voltage applied to the second motor.

The first and second current detectors 611, 621 detect a drive current applied to the compressor based on a load of the compressor or a load of the freezer. The current detectors 611, 621 detect a motor current applied to the compressor motor. The first and second voltage detectors 612, 622 detect a motor voltage applied to the compressor. The voltage detectors detect a motor voltage applied between both ends of the compressor motor based on a load of the compressor.

The compressor control apparatus according to embodiments as broadly described herein may also include a first stroke calculator 613 and a second stroke calculator 623 configured to calculate a first and second stroke of the first and second compressor, respectively, using the motor drive current and the motor drive voltage. The relationship among the motor voltage, motor current, and stroke is as follows. The first and second stroke calculators 613, 623 may calculate a stroke using the following equation based on a motor voltage detected through the first and second voltage detectors 612, 622, and a motor current detected through the first and second current detectors 611, 621.

$$x = \frac{1}{\alpha} \int \left( Vm - Ri - L\frac{di}{dt} \right) dt \qquad \text{Equation 1}$$

In Equation 1, x is a stroke, a is a motor constant, Vm is a motor voltage, R is a resistance, L is an inductance, and i is a motor current.

The controller 50 receives a first stroke instruction value (xref1) and compares a first stroke estimate value (x1) calculated by the first stroke calculator 613 with the first stroke instruction value (xref1). The controller 50 compares the first stroke estimate value (x1) with the first stroke instruction value (xref1), and generates an inverter control signal for controlling switching elements S1-S2 and S3-S4 based on the comparison result. In addition, the controller 50 receives a second stroke instruction value (xref2) and compares a second stroke estimate value (x2) calculated by the second stroke calculator 623 with the second stroke instruction value (xref2). The controller 50 compares the second stroke estimate value (x2) with the second stroke instruction value (xref2), and generates an inverter control signal for controlling switching elements S3-S4 and S5-S6 based on the comparison result. The driver 70 may select switching elements connected to the first compressor C1 or switching elements connected to the second compressor C2 based on the inverter control signal to generate drive signals as appropriate, namely, a switching circuit or element for opening or closing a switching element within the inverter 40. The compressor control apparatus may perform sensorless control, and the detailed description thereof will be omitted.

The first and second load detectors 61, 62 may detect a load on the first compressor C1 and the second compressor C2, respectively, using the motor drive current, the motor drive voltage, or the first and second stroke. The controller 50 independently operates the first compressor C1 and the second compressor C2 based on the load on the first compressor C1 and the second compressor C2 detected through the first load detector 61 and the second load detector 62.

The size of the compressor load may be detected using a phase difference between the motor current and stroke estimate value, and a phase difference between the motor voltage and stroke estimate value. Furthermore, the size of the compressor load may be detected using a gas spring constant Kg. In addition, the size of the compressor load may be detected using a gas damping constant Cg.

Figure 11:
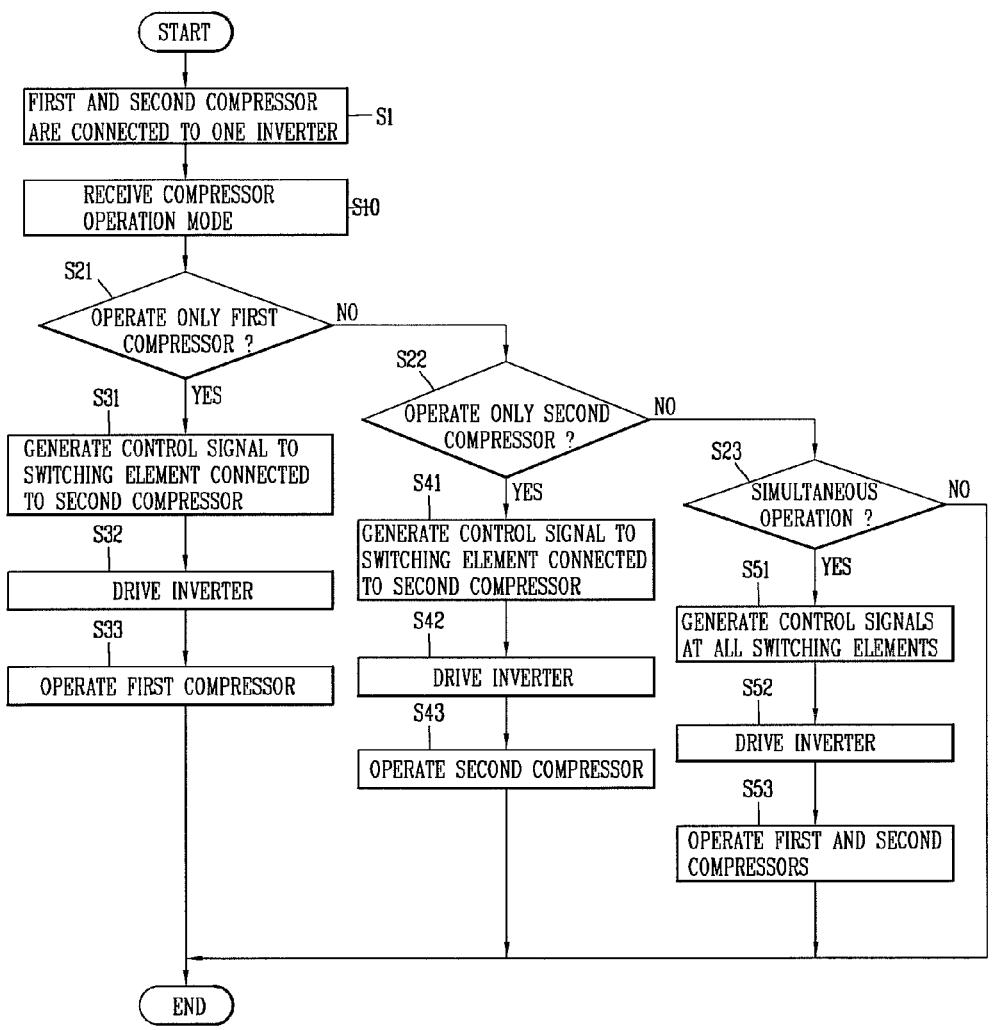
FIG. 11 is a flow chart of a compressor control method, according to an embodiment as broadly described herein.

Referring to FIG. 11, a compressor control method according to an embodiment as broadly described herein may control a first compressor and a second compressor using a single inverter. The control method may include receiving a compressor operation mode (S10) in an apparatus in which first and second compressors are connected to a single inverter, and driving predetermined switching elements within the single inverter based on the compressor operation mode (S21 and subsequent). The compressor operation mode may be a mode determined by a load or required freezing capacity of the first and second compressors. The compressor operation mode may control a compression amount or the like of each compressor, including a mode of operating only the first compressor, a mode of operating only the second compressor, and a mode of operating the first and second compressor simultaneously. Hereinafter, the configuration of the apparatus will be described with reference to FIGS. 1 and 2.

The driving step may include inputting a control signal to appropriate switching elements within the one inverter to drive them (S31, S41, S42). The driving step may further include controlling the operation of the first compressor, or the second compressor, or the both first and second compressors, connected to the driven switching elements (S33, S43, S53).

First, the first and second compressors are connected to switching elements within the inverter, respectively (S1). Then, it is determined whether to operate only the first compressor, operate only the second compressor, or operate the first and second compressors in a simultaneous manner (S21, S22, S23).

Hereinafter, the operation of the first and second compressor will be described with reference to FIGS. 4A through 10.

Figure 4A:
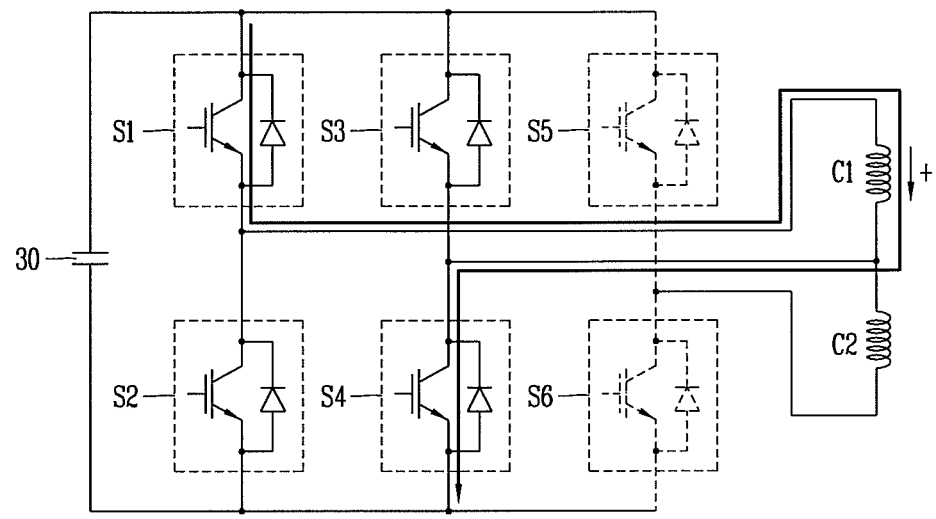
FIGS. 4A and 4B illustrate control of a first compressor of two compressors, according to embodiments as broadly described herein.
Figure 4B:
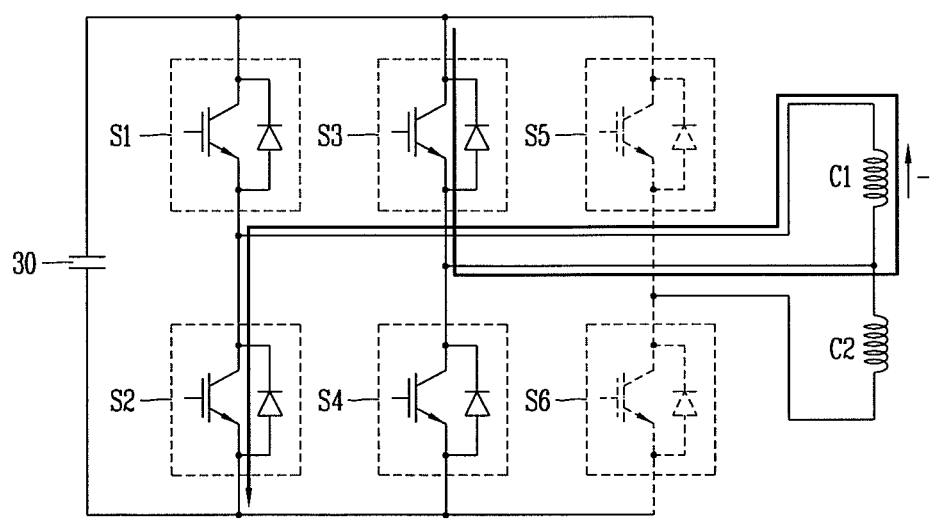
Figure 5:
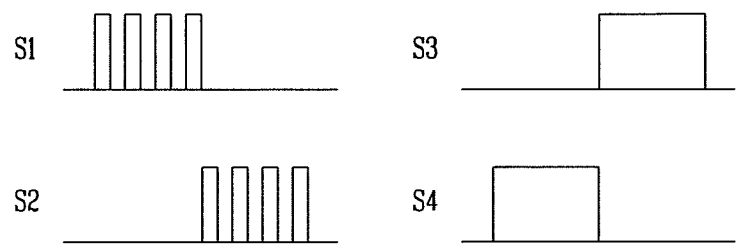
FIG. 5 illustrates a switching frequency of switching elements connected to a first compressor of two compressors.

Controlling the operation of the first compressor C1 using switching elements S1, S2, S3, S4 within the inverter 40 (S21) will be described with reference to FIGS. 4A and 4B. The first compressor C1 is connected to switching elements S1, S2, S3, S4 of the inverter 40. When the controller 50 generates a control signal for operating only the first compressor C1 based on a compressor operation mode (S31), the switching elements are driven based on the control signal (S32). Referring to FIG. 4A, a positive (+) current of the first compressor C1 flows through switching elements S1 and S4. Meanwhile, referring to FIG. 4B, a negative (−) current of the first compressor C1 flows through switching elements S2 and S3. Referring to FIG. 5, a drive signal for a pair of switching elements S3, S4 commonly connected to the second compressor C2 has an operating frequency (for example, 60 Hz). On the other hand, a drive signal for the other switching elements S1, S2 has a carrier frequency (for example, 3 kHz) for the first compressor C1.

Figure 6A:
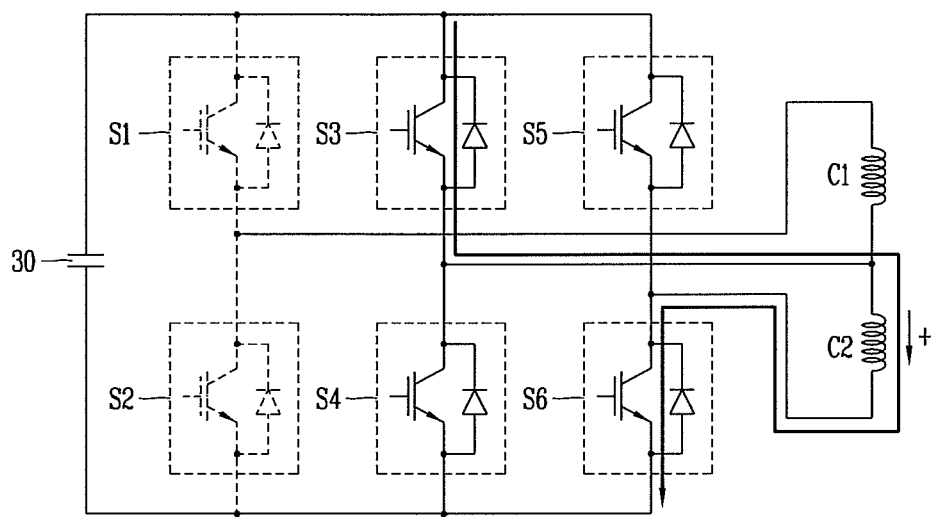
FIGS. 6A and 6B illustrate control of a second compressor of the two compressors, according to the embodiments as broadly described herein.
Figure 6B:
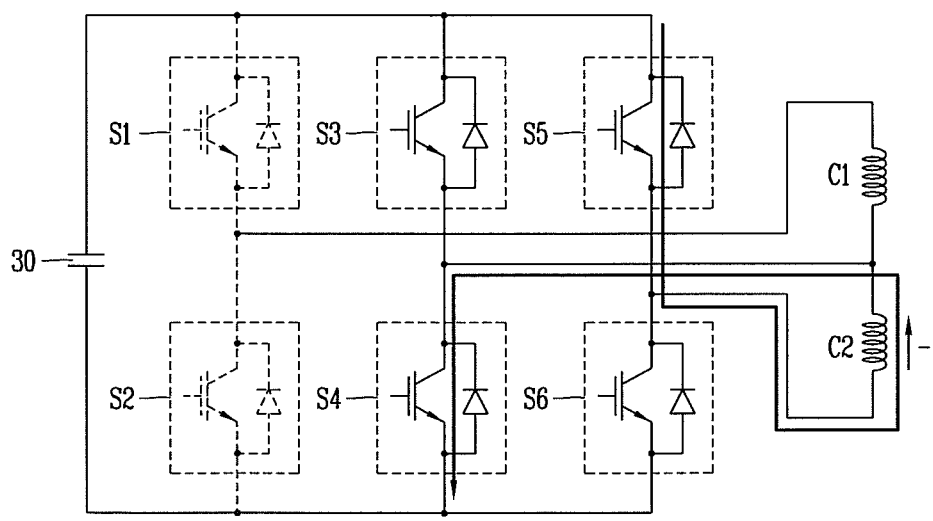
Figure 7:
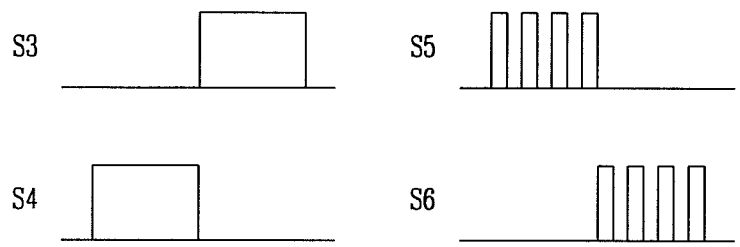
FIG. 7 illustrates a switching frequency of switching elements connected to a second compressor of the two compressors.

Controlling the operation of the second compressor C2 using switching elements S3, S4, S5, S6 within the inverter 40 (S22) will be described with reference to FIGS. 6A and 6B. The second compressor C2 is connected to switching elements S3, S4, S5, S6 of the inverter 40. When the controller 50 generates a control signal for operating only the second compressor C2 based on a compressor operation mode (S41), the switching elements are driven based on the control signal (S42). Referring to FIG. 6A, a positive (+) current of the second compressor C2 flows through switching elements S3 and S6. Meanwhile, referring to FIG. 6B, a negative (−) current of the second compressor flows through switching elements S4 and S5. Referring to FIG. 7, a drive signal for a pair of switching elements S3, S4 commonly connected to the first compressor C1 has an operating frequency (for example, 60 Hz). On the other hand, the other switching elements S5, S6 are switched at a carrier frequency (for example, 3 kHz) for the second compressor C2.

Figure 8A:
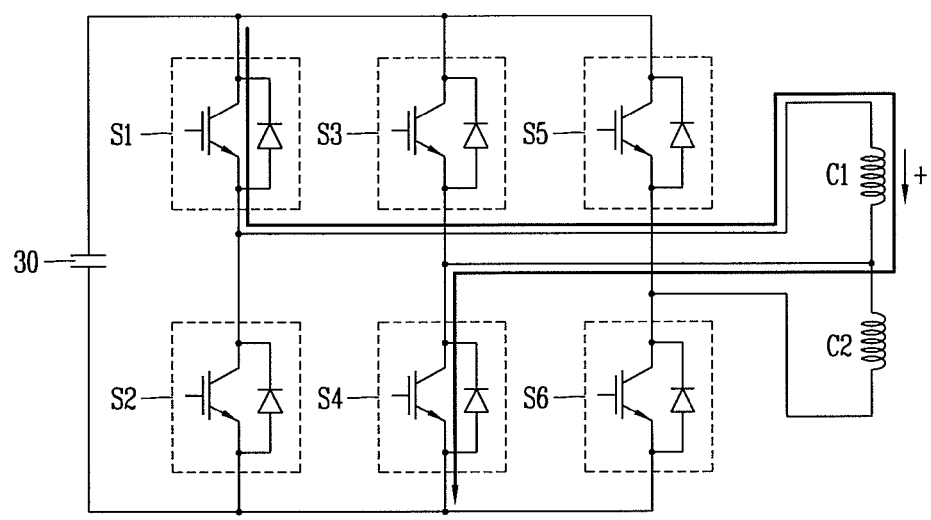
FIGS. 8A through 9B illustrate simultaneous operation of two compressors, according to embodiments as broadly described herein.
Figure 8B:
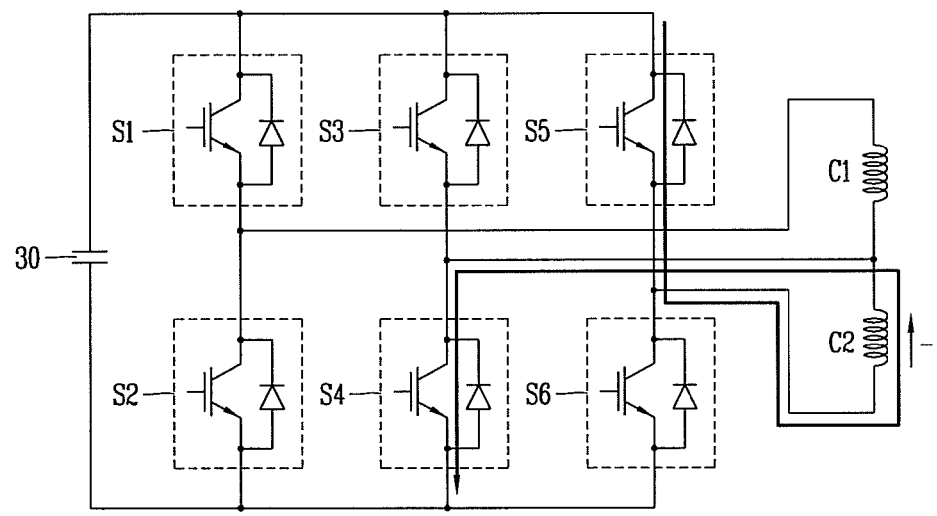
Figure 9A:
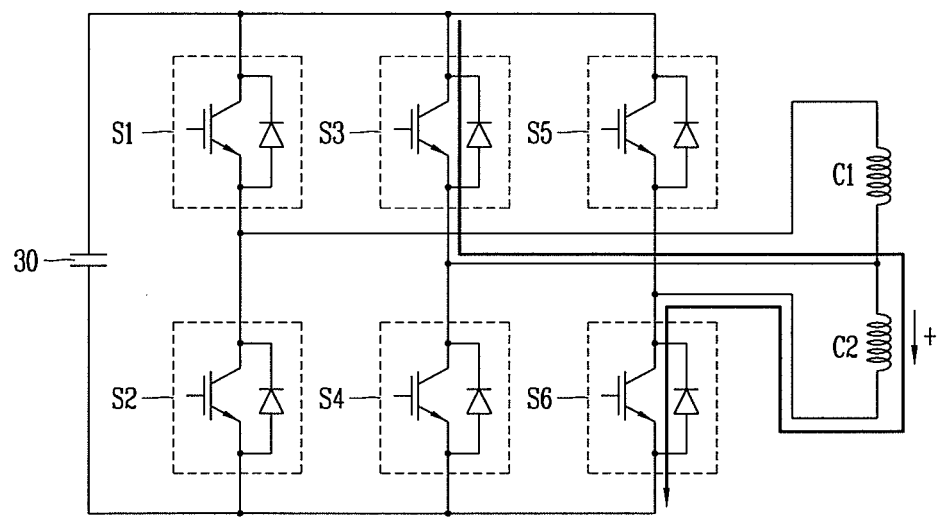
Figure 9B:
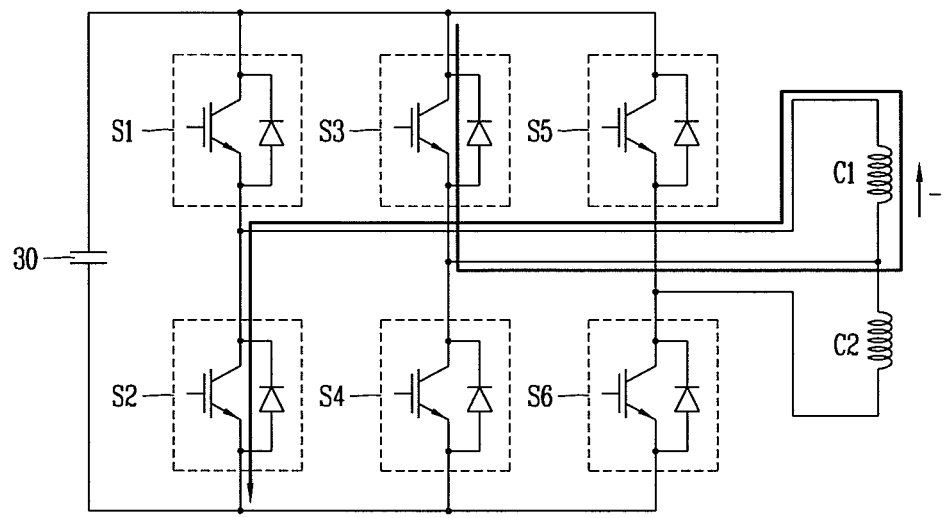
Figure 10:
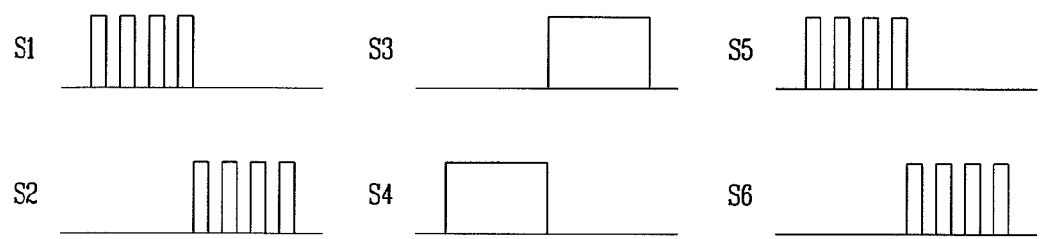
FIG. 10 illustrates a switching frequency of the switching elements when two compressors are simultaneously operated.

Controlling the operation of the first and second compressors using switching elements S1 to S6 within the inverter 40 (S23) will be described with reference to FIGS. 8A through 9B. The current control of the first compressor C1 in the positive (+) direction is carried out using switching element S1 (FIG. 8A), and the current control of the second compressor C2 in the negative (−) direction is carried out using switching element S5 (FIG. 8B). At this time, a common current flows through switching element S4. Meanwhile, the current control of the first compressor C1 in the negative (−) direction is carried out using switching element S2 (FIG. 9B), and the current control of the second compressor C2 in the positive (+) direction is carried out using switching element S6 (FIG. 9A). At this time, a common current flows through switching element S3. In other words, as illustrated in FIGS. 8 and 9, the current directions flowing through the first compressor C1 and second compressor C2 are opposite to each other. Referring to FIG. 10, a pair of switching elements S3, S4 commonly used for the first compressor C1 and second compressor C2 are switched at an operating frequency (for example, 60 Hz) whereas the other switching elements S1, S2, S5, S6 are switched at a carrier frequency for each of them. Here, carrier frequencies for the first and the second compressor may be substantially the same (for example, 3 kHz), but may be also different frequencies (for example, 2 kHz at S1, S2 for the first compressor C1, and 3 kHz at S5, S6 for the second compressor C2).

As described above, in a compressor control apparatus and a refrigerator including the same, according to the embodiments as broadly described herein, the operation of two compressors may be controlled using one inverter, thereby minimizing the number of components as well as increasing the compressor capacity and enhancing the operation efficiency of the system. According to embodiments as broadly described herein, a plurality of operation modes may be used to correspond to a load or freezing capacity using two compressors, Furthermore, two compressors may be operated independently or simultaneously using one inverter, thereby simplifying the configuration of the system and reducing cost. Moreover, commonly used switching elements may be switched at an operating frequency, allowing the simultaneous operation of two compressors, reducing switching losses, and improving efficiency and stability of the system.

A compressor control apparatus is provided that is capable of operating two compressors both in a separate manner or a simultaneous manner using one single inverter, and a refrigerator including the same.

A compressor control apparatus is provided that is capable of varying the frequencies of switching elements of an inverter in operating two compressors using one inverter to enable simultaneous operation, and a refrigerator including the same.

A compressor control apparatus according to an embodiment as broadly described herein may include one inverter provided with three pairs of switching elements in which one pair of the three pairs of switching elements is commonly connected to a first and a second compressor, and switched based on drive signals for each pair of switching elements, and a control unit configured to generate an inverter control signal configured with the drive signals based on a load state of the first and the second compressor and output it to the one inverter, wherein a drive signal for the commonly connected one pair of switching elements has a frequency slower than those of drive signals for the other pairs of switching elements.

The control unit may be configured such that the drive signal for the commonly connected one pair of switching elements has an operating frequency.

A compressor control apparatus according to an embodiment may also include a converter configured to rectify commercial alternating current power to direct current power, a smoothing unit configured to smoothen and store the rectified direct current power, and a drive unit configured to receive the inverter control signal and output the drive signals to the one inverter.

A refrigerator as embodied and broadly described herein may include a refrigerator body, first and second compressors provided in the refrigerator body to compress refrigerant, a single inverter provided with three pairs of switching elements, and switched based on drive signals for each pair of switching elements, first and second load detection units configured to detect a load of the first and the second compressor, and a control unit configured to generate an inverter control signal configured with the drive signals based on a load state of the first and the second compressor and output it to the one inverter. In certain embodiments, one pair of the three pairs of switching elements provided in the one inverter may be commonly connected to the first and the second compressor, and switched at an operating frequency.

According to the embodiments as broadly described herein, the operation of two compressors may be controlled using one inverter, thereby minimizing the number of components, increasing the compressor capacity and enhancing the operation efficiency of the system.

According to the embodiments as broadly described herein, a plurality of operation modes may be used to correspond to a load or freezing capacity using two compressors. Furthermore, two compressors may be operated in a separate or simultaneous manner using one inverter, thereby simplifying the configuration of the system and reducing cost.

According to the embodiments as broadly described herein, commonly used switching elements may be switched at an operating frequency contrary to the other switching elements in operating two compressors using one inverter, thereby allowing the simultaneous operation of two compressors, reducing switching losses, and improving efficiency and stability of the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor control apparatus, comprising:
    a single inverter including first, second and third pairs of switching elements, wherein the first pair of switching elements is commonly connected to a first compressor and a second compressor, and wherein the three pairs of switching elements are switched in response to a plurality of drive signals respectively corresponding to the three pairs of switching elements; and
    a controller configured to generate an inverter control signal including the plurality of drive signals based on a load state of the first and second compressors, and to output the inverter control signal to the single inverter, wherein an operating frequency of a first drive signal of the plurality of drive signals corresponding to the first pair of switching elements is lower than carrier frequencies of drive signals corresponding to the second and third pairs of switching elements,
    wherein carrier frequencies corresponds to carrier frequencies of the first and second compressors, and
    wherein the controller generates the plurality of drive signals such that the controller is able to selectively control operation of at least one of the first compressor or the second compressor.

2. The compressor control apparatus of claim 1, wherein the carrier frequencies of the first and the second compressors are the same or different from each other.

3. The compressor control apparatus of claim 1, further comprising:
    a converter configured to rectify commercial alternating current power to direct current power;
    a smoothing device configured to smoothen and store the rectified direct current power; and
    a driver configured to receive the inverter control signal and output the plurality of drive signals to the single inverter.

4. The compressor control apparatus of claim 1, wherein the controller is configured to respectively connect the first and second compressors to two of the three pairs of switching elements, and to operate the first and second compressors simultaneously or separately.

5. The compressor control apparatus of claim 1, further comprising:
    first and second current detectors configured to detect first and second motor drive currents applied to first and second motors of the first and second compressors, respectively; and first and second voltage detectors configured to detect first and second motor drive voltages applied to the first and second motors, respectively.

6. The compressor control apparatus of claim 5, further comprising:
first and second stroke calculators configured to calculate first and second strokes of the first and second compressors, respectively, using the first and second motor drive currents and the first and second motor drive voltages.

7. The compressor control apparatus of claim 1, further comprising:
first and second load detectors configured to detect a load for the first and second compressors, respectively.

8. The compressor control apparatus of claim 1, wherein at least one of the first compressor or the second compressor is a linear compressor.

9. A refrigerator, comprising:
a main body;
first and second compressors provided in the main body;
a single inverter including first, second and third pairs of switching elements, the three pairs of switching elements being switched based on a plurality of drive signals corresponding to the three pairs of switching elements;
first and second load detectors configured to detect a load of the first and second compressors, respectively; and
a controller configured to generate an inverter control signal including the plurality of drive signals based on a load state of the first and second compressors, and to output the inverter drive signal to the single inverter, wherein the first pair of switching elements provided in the single inverter is commonly connected to the first and second compressors, and is switched at an operating frequency,
wherein the drive signals corresponding to the second and third pairs of switching elements have carrier frequencies of the first and second compressors, and
wherein the controller is configured to generate the plurality of drive signals such that the controller is able to selectively control operation of at least one of the first compressor or the second compressor.

10. The refrigerator of claim 9,
wherein the carrier frequencies of the first and the second compressors are same or different from each other.

11. The refrigerator of claim 9, further comprising:
a converter configured to rectify commercial alternating current power to direct current power;
a smoothing device configured to smoothen and store the rectified direct current power; and
a driver configured to receive the inverter control signal and output the plurality of drive signals to the single inverter.

12. A compressor control method for controlling a first compressor and a second compressor using a single inverter having first, second and third pairs of switching elements, the first pair of switching elements being commonly connected to the first and second compressors, and the three pairs of switching elements being switched in response to a plurality of drive signals corresponding to the three pairs of switching elements, the method comprising:
receiving a compressor operation mode; and
selectively driving one or more of the three pairs of switching elements of the single inverter based on the received compressor operation mode, wherein an operating frequency of a drive signal one of the plurality of drive signals corresponding to the first pair of switching elements is lower than carrier frequencies of drive signals corresponding to the second and third pairs of switching elements,
wherein carrier frequencies corresponds to carrier frequencies of the first and second compressors, and
wherein at least one of the first compressor or second compressor is selectively operated by the switching elements based on the drive signals received.

13. The method of claim 12,
wherein the carrier frequencies of the first and the second compressors are same or different from each other.

14. The method of claim 12, wherein the compressor operation mode is determined based on a load or required freezing capacity of the first and second compressors, and comprises at least one of a first mode, a second mode or a third mode, the first mode comprising operating only the first compressor, the second mode comprising operating only the second compressor, and the third mode comprising operating the first and second compressors simultaneously.

15. The method of claim 14, wherein driving one or more of the three pairs of switching elements comprises:
inputting a control signal to one or more of the switching elements within the single inverter selectively drive the one or more switching elements; and
controlling operation of the first compressor, or the second compressor, or both the first and second compressors, connected to the one or more driven pairs of switching elements.

* * * * *